United States Patent
Park et al.

(10) Patent No.: US 10,673,080 B2
(45) Date of Patent: Jun. 2, 2020

(54) JIG MODULE FOR SOLID OXIDE FUEL CELL

(71) Applicant: LG CHEM, LTD., Seoul (KR)

(72) Inventors: Kwangyeon Park, Daejeon (KR); Sanghyeok Im, Daejeon (KR); Yeonhyuk Heo, Daejeon (KR); Tai Min Noh, Daejeon (KR); Kwangwook Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 241 days.

(21) Appl. No.: 15/772,896

(22) PCT Filed: Aug. 24, 2017

(86) PCT No.: PCT/KR2017/009256
§ 371 (c)(1),
(2) Date: May 2, 2018

(87) PCT Pub. No.: WO2018/038550
PCT Pub. Date: Mar. 1, 2018

(65) Prior Publication Data
US 2018/0316025 A1    Nov. 1, 2018

(30) Foreign Application Priority Data
Aug. 25, 2016  (KR) .................. 10-2016-0108529

(51) Int. Cl.
*H01M 8/0273* (2016.01)
*H01M 8/04298* (2016.01)
*H01M 8/04664* (2016.01)
*H01M 8/04746* (2016.01)
(Continued)

(52) U.S. Cl.
CPC ..... *H01M 8/0273* (2013.01); *H01M 8/04305* (2013.01); *H01M 8/04671* (2013.01); *H01M 8/04753* (2013.01); *H01M 8/004* (2013.01); *H01M 2008/1293* (2013.01)

(58) Field of Classification Search
CPC .......... H01M 8/0273; H01M 8/04671; H01M 8/04753; H01M 2008/1293
See application file for complete search history.

(56) References Cited

U.S. PATENT DOCUMENTS

2013/0061661 A1    3/2013  Morel et al.

FOREIGN PATENT DOCUMENTS

| JP | 2003-329532 A | 11/2003 |
| JP | 2009-110908 A | 5/2009 |
| JP | 2009-252561 A | 10/2009 |

(Continued)

OTHER PUBLICATIONS

International Search Report (PCT/ISA/210) issued in PCT/KR2017/009256, dated Nov. 30, 2017.

(Continued)

*Primary Examiner* — Osei K Amponsah
(74) *Attorney, Agent, or Firm* — Birch, Stewart, Kolasch & Birch, LLP

(57) ABSTRACT

The present invention relates to a technology for a jig for evaluating a solid oxide fuel cell, and more particularly, to a jig for evaluating a solid oxide fuel cell in which a press is formed in an upper plate and a lower plate of a jig which evaluates a characteristic of a fuel cell, so that gas leakage through a sealant and attachment strength of the sealant and a performance of a unit cell are simultaneously evaluated by using one jig.

7 Claims, 2 Drawing Sheets

(51) Int. Cl.
*H01M 8/124* (2016.01)
*H01M 8/00* (2016.01)

(56) References Cited

FOREIGN PATENT DOCUMENTS

| | | |
|---|---|---|
| JP | 2010-123566 A | 6/2010 |
| KR | 10-2010-0102358 A | 9/2010 |
| KR | 10-2015-0015667 A | 2/2015 |
| KR | 10-2015-0055648 A | 5/2015 |

OTHER PUBLICATIONS

Extended European Search Report, dated Oct. 11, 2018, for European Application No. 17843970.9.

[Figure 1]
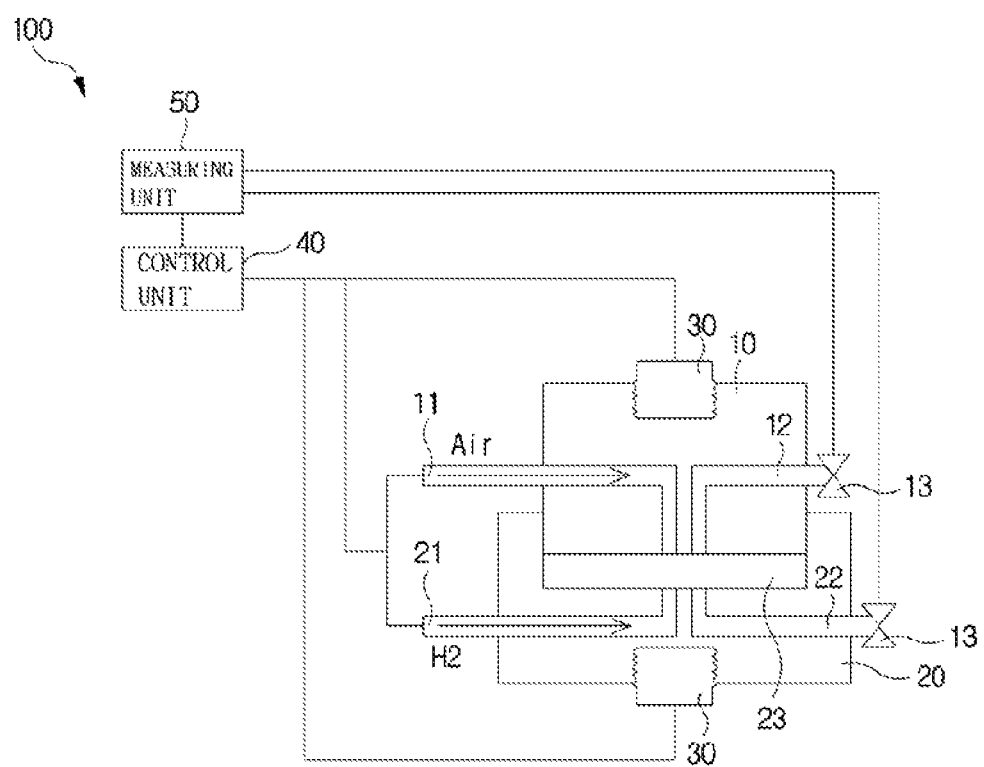

[Figure 2]
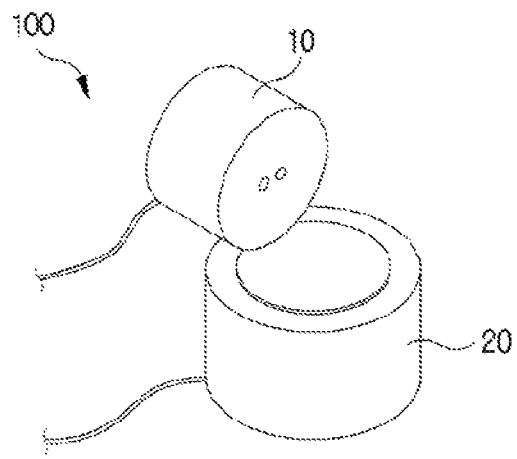
[Figure 3]
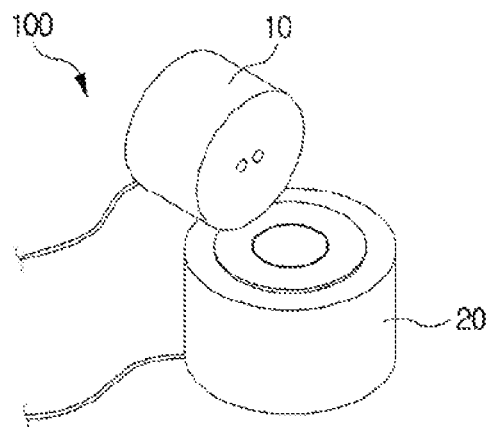

JIG MODULE FOR SOLID OXIDE FUEL CELL

TECHNICAL FIELD

This application claims priority to and the benefit of Korean Patent Application No. 10-2016-0108529 filed in the Korean Intellectual Property Office on Aug. 25, 2016, the entire contents of which are incorporated herein by reference.

The present invention relates to a technology for a jig module for a solid oxide fuel cell, and more particularly, to a jig module for a solid oxide fuel cell in which a press is bonded to upper and lower jigs of a jig which evaluates a characteristic of a fuel cell so that gas leakage through a sealant and attachment strength of the sealant and a performance of a unit cell are simultaneously evaluated by using one jig.

BACKGROUND ART

The fuel cell is a device which directly produces electricity through an electrochemical reaction of hydrogen and oxygen in the air, and is an energy source which is eco-friendly, has high energy efficiency, and has a high value added through technology development. Specifically, the solid oxide fuel cell which is a third-generation fuel cell has advantages in that the solid oxide fuel cell does not need a complex external reforming system as compared with other fuel cells, and does not use a noble metal electrode catalyst such as platinum, and is not corroded due to a liquid electrolyte, so that various operating problems caused in a low temperature fuel cell may be minimized, and the solid oxide fuel cell may maintain an operating temperature through appropriate insulation at the time of a high temperature operation and use various fuels.

A configuration of the solid oxide fuel cell is formed of a unit cell, which includes a fuel electrode, an electrolyte, and an air electrode, and a connecting material, which connects unit cells. Among them, the sealant serves to prevent fuel gas supplied to a fuel electrode (anode) between an electrolyte layer and a metal connector and air supplied to an air electrode from being mixed with each other and to prevent gas leakage to the outside. The sealant is a very important core component for ensuring thermal mechanical stability and a long life-span of a stack, and operates at a high temperature of 600° C. to 800° C., so that importance of development of the sealant is increased.

The related art has a problem in that in order to evaluate a characteristic of the sealant, performances of a fuel cell and a sealant are measured not only using the sealant, but also using fuel cell having a complex structure in which all components such as a unit cell, a window frame (or a separator), and an interconnector are laminated.

Further, the solid oxide fuel cell is classified into a planar type, a cylindrical type, and a planar tubular type, and there is a problem in that a structure of the device which measures a performance and a characteristic is subdivided according to the type.

Further, a device for measuring a characteristic of a solid oxide fuel cell in the related art may use one device to make only one measurement to measure a performance of the fuel cell or evaluate whether gas is leaked through the sealant, so that there is a problem in that in order to measure various performances of the solid oxide fuel cell and a component thereof, the device needs to be converted into a measuring device suitable therefor.

DETAILED DESCRIPTION OF THE INVENTION

Technical Problem

The present invention has been contrived to solve the above-described problems, and an object of the present-invention is to provide a jig module for a solid oxide fuel cell in which a press unit is bonded to upper/lower jigs in which a gas outlet pipe and a gas inlet pipe are formed to measure complex characteristics using one jig module for a solid oxide fuel cell such as evaluation of gas leakage through a sealant and attachment strength of a sealant and evaluation of performance of a unit cell.

Technical Solution

A jig module for a solid oxide fuel cell according to the present invention, including: a lower jig which includes: a seating groove; a hydrogen supply pipe having one side connected to the seating groove; and a hydrogen discharge pipe having the other side connected to the seating groove; and an upper jig including an oxygen supply pipe and an oxygen discharge pipe, in which the upper jig is coupled to be fitted into the seating groove to form a sealed portion.

The upper jig may be configured such that one side of the oxygen supply pipe and the other side of the oxygen discharge pipe communicate with each other toward the sealed portion.

The jig module may further include a press unit which moves the upper jig and the lower jig in a vertical direction.

The upper jig and the lower jig may have cylindrical shapes.

Valves which controls flow rates of oxygen and hydrogen may be provided at one end of each of the hydrogen discharge pipe and the oxygen discharge pipe.

When a sealant is located in the seating groove, the jig module may further include a measuring unit which measures whether the gas is leaked through the sealant and attachment strength of the sealant.

When a unit cell is located in the seating groove, the jig module may further include a measuring unit which evaluates a performance of the unit cell.

The jig module may further include a control unit which controls any one or more of a vertical movement of the press unit, a flow rate of oxygen which flows into the oxygen supply pipe, and a flow rate of hydrogen which flows into the hydrogen supply pipe.

Advantageous Effects

According to the present invention, a gas outlet pipe and a gas inlet pipe are formed in upper and lower jigs and a press unit is bonded to one side so that one evaluating jig is used to evaluate gas leakage through the sealant, attachment strength of the sealant, and a performance of the unit cell, and as a result, a time to evaluate a performance of a solid oxide fuel cell may be shortened and an economic effect may be achieved.

Further, in order to evaluate the performance of the sealant, the performance of the sealant may be evaluated only using the sealant without including an evaluating component of the solid oxide fuel cell so that a method for evaluating a performance of a sealant may be simplified, performances of several types of sealants may be simultaneously evaluated, and the performance of the sealant may be evaluated regardless of the shape of the solid oxide fuel cell.

BRIEF DESCRIPTION OF DRAWINGS

FIG. 1 is a cross-sectional view of a jig module for a solid oxide fuel cell according to an exemplary embodiment of the present invention.

FIG. 2 is a view illustrating a jig module for a solid oxide fuel cell where a sealant is located in a seating groove.

FIG. 3 is a view illustrating a jig module for a solid oxide fuel cell where a unit cell is located in a seating groove.

BEST MODE

The present invention will be described in detail below with reference to the accompanying drawings. Herein, repeated description and the detailed description of a publicly-known function and configuration that may make the gist of the present invention unnecessarily ambiguous will be omitted. Exemplary embodiments of the present invention are provided for completely explaining the present invention to those skilled in the art. Accordingly, the shape, the size, etc., of constituent elements in the drawings may be exaggerated for explicit explanation.

Throughout the specification, unless explicitly described to the contrary, the word "include/comprise" and variations such as "includes/comprises" or "including/comprising" will be understood to imply the inclusion of stated constituent elements, not the exclusion of any other constituent elements.

Hereinafter, preferred embodiments will be suggested for better understanding of the present invention. However, the following exemplary embodiments are provided only for better understanding of the present invention, and thus the present invention is not limited by the exemplary embodiments.

Jig Module for Solid Oxide Fuel Cell

FIG. 1 is a cross-sectional view of a jig module 100 for a solid oxide fuel cell according to an exemplary embodiment of the present invention. The jig module 100 for a solid oxide fuel cell according to an exemplary embodiment of the present invention will be described in detail with reference to FIG. 1.

The jig module 100 for a solid oxide fuel cell includes an upper jig 10, a lower jig 20, and a press unit 30. Further, the upper jig 10 and the lower jig 20 may be formed to have a cylindrical shape, and the upper jig 10 and the lower jig 20 may be formed of metal or ceramic.

The upper jig 10 may include an oxygen supply pipe 11 and an oxygen discharge pipe 12, and the lower jig 20 may include a hydrogen supply pipe 21 and a hydrogen discharge pipe 22. It should be noted that the oxygen supply pipe 11, the oxygen discharge pipe 12, the hydrogen supply pipe 21, and the hydrogen discharge pipe 22 may be formed of alumina and alumina may be formed of an alumina material having a high melting point obtained by oxidizing aluminum.

Further, in the lower jig 20, a seating groove (not illustrated) in which any one of a sealant and a unit cell is located may be formed, and in order to evaluate gas leakage through a sealant and a performance of a unit cell, the seating groove is coupled to be fitted to the upper jig 10 to be sealed to form a sealed portion 23. Therefore, a size of the upper jig 10 may be smaller than a size of the lower jig 20 and may be equal to a size of the seating groove.

One side of the oxygen supply pipe 11 and the other side of the oxygen discharge pipe 12 of the upper jig 10 may be downwardly configured to communicate with each other toward the sealed portion 23, and one side of the hydrogen supply pipe 21 and the other side of the hydrogen discharge pipe 22 of the lower jig 20 may be upwardly configured to communicate with each other toward the seating groove.

When the unit cell is located in the seating groove, the upper jig 10 and the lower jig 20 may serve as an evaluating unit which measures a current and a voltage output from the unit cell. For example, the upper jig 10 serves as a positive electrode and the lower jig 20 serves as a negative electrode to measure power consumption (W: watt) of the unit cell per unit area. Performance measurement of the unit cell will be described below with reference to FIG. 3.

Further, the upper jig 10 and the low jig 20 may serve as an air electrode interconnector and a fuel electrode interconnector, in this case, a flow passage may be formed on a surface on which the upper jig 10 and the lower jig 20 are in contact with the unit cell.

Valves 13 which control flow rates of oxygen and hydrogen may be provided at one end of each of the oxygen discharge pipe 21 and the hydrogen discharge pipe 22. When oxygen and hydrogen are supplied through the oxygen supply pipe 11 and the hydrogen supply pipe 21, it is possible to prevent the supplied oxygen and hydrogen from being leaked to the outside, by closing the valves 13 and when gas leakage through the sealant is measured, it is possible to measure amounts of oxygen and hydrogen leaked through the sealant by opening the valves 13.

The jig module 100 may further include a measuring unit 50, and when the sealant is located in the seating groove, the measuring unit 50 is connected to the upper jig 10, the lower jig 20, and the valves to measure whether gas is leaked through the sealant and attachment strength of the sealant. Further, when the unit cell is located in the seating groove, the measuring unit 50 is connected to the upper jig 10 and the lower jig 20 to evaluate a performance of the unit cell. Methods for measuring whether the gas is leaked through the sealant and the attachment strength of the sealant, and evaluating a performance of the unit cell will be described below with reference to FIGS. 2 and 3.

The press unit 30 is disposed at one side of each of the upper jig 10 and the lower jig 20, and may serve to move the upper jig 10 and the lower jig 20. For example, in order to measure attachment strength of the sealant, the press unit 30 which is attached to the upper jig 10 upwardly pulls the upper jig 10 and the press unit 30 which is attached to the lower jig 20 downwardly pulls the lower jig 20 to stretch the sealant.

Further, the press units 30 may bring the sealant and the unit cell into close contact with the upper jig 10 and the lower jig 20 and pressurize the upper jig 10 and the lower jig 20 to seal the sealed portion 23.

The press units 30 are attached to the upper jig 10 and the lower jig 20, respectively, so that the performance of the sealant and the performance of the unit cell may be simultaneously measured, and as a result, there is no need to replace an evaluating jig in accordance with a measurement purpose, so that economic effect is achieved.

The jig module 100 for a solid oxide fuel cell according to the present invention may further include a control unit 40 which controls any one or more of a vertical movement, of the press unit 30, a flow rate of oxygen which flows into the oxygen supply pipe 11, and a flow rate of hydrogen which flows into the hydrogen supply pipe 21. For example, the control unit is connected to the press unit 30 to measure attachment strength of the sealant, and is connected to the valve located at one end of each of the oxygen discharge pipe 12 and the hydrogen discharge pipe 22 to measure a leakage amount of the oxygen and hydrogen, which are leaked through the sealant, and determine the performance of the sealant. Moreover, the control unit is connected to the upper jig 10 and the lower jig 20 to adjust, an amount, of a current applied to the unit cell and the fuel cell, and is connected to the measuring unit 50 to measure voltages of the air electrode and the fuel electrode due to the applied current to measure performances of the unit cell and the fuel cell.

Further, when the jig module 100 further includes a bonding member, if the upper jig 10 and the lower jig 20 are vertically applied to measure attachment strength of the sealant, the control unit may control the bonding member to be off to separate the upper jig 10 and the lower jig 20 from each other, and when an amount of gas leaked through the sealant and the performance of the unit cell are measured, the control unit may control the bonding member to be on to seal the sealed portion 23.

Since the control unit 40 uses an existing publicly-known technology, a detailed description thereof will be omitted.

FIG. 2 is a photograph illustrating the jig module 100 for a solid oxide fuel cell where a sealant is located in a seating groove. The jig module 100 for a solid oxide fuel cell according to the present invention may measure the attachment strength of the sealant and whether the gas is leaked, only using the sealant.

For example, in a sealant attachment strength experiment, after locating the sealant in the seating groove formed in the lower jig 20, the upper jig 10 is covered to form a sealed portion, and the upper jig 10 and the lower jig 20 are vertically stretched using the press unit to measure the attachment strength of the sealant.

In a sealant gas leakage amount experiment, after-locating the sealant in the seating groove formed in the lower jig 20, the upper jig 10 is covered to form a sealed portion, and the sealant and the upper jig 10 and the lower jig 20 are brought into close contact with each other using the press unit to remove an empty space from the sealed portion.

Alternatively, the upper jig 10 and the lower jig 20 are brought into close contact with each other using a bonding member formed at a side of the sealed portion to seal the sealed portion. The bonding member may prevent air and hydrogen from being leaked to the outside and prevent outside gas from flowing into the sealed portion while the air and hydrogen pass through the sealant, but it should be noted that the sealed portion may be sealed by coupling the upper jig 10 to be fitted into the seating groove and the sealant located in the seating groove, so that the bonding member may be omitted.

Thereafter, gas is supplied to the sealed portion through the oxygen supply pipe and the hydrogen supply pipe to measure whether gas is leaked through the sealant. In this case, since the valves located at one end of each of the oxygen discharge pipe and the hydrogen discharge pipe are connected to the measuring unit, it is possible to determine whether gas is leaked through the sealant by opening the valves.

Further, since the solid oxide fuel cell operates at a high temperature, the experiment for determining whether the gas is leaked through the sealant may be performed at a temperature of 400° C. to 1,100° C. For example, a composition and sealants having different properties are located in the jig module 100 for a solid oxide fuel cell and put in an electric furnace at a temperature of 400° C. to 1,100° C. to perform an experiment for a sealant gas leakage rate. Therefore, the gas leakage rate experiment is available without the configurations of the solid oxide fuel cell other than the sealant, and as a result, the experiment steps are simplified, and performances of one or more sealants are simultaneously measured, thereby shortening a time therefor.

FIG. 3 is a photograph illustrating the jig module 100 for a solid oxide fuel cell where a unit cell is located in a seating groove. The unit cell is located in the seating groove, and the sealant is located around the unit cell, so that the upper jig 10 is fixed into the seating groove and the sealed portion is sealed.

The upper jig 10 and the lower jig 20 may serve as an evaluating unit which is in contact with an air electrode and a fuel electrode of the unit cell to measure any one or more of a current, a voltage, and power consumption which are output to the unit cell. For example, when oxygen is supplied to the air electrode through the oxygen supply pipe, oxygen receives electrons from the outside to be reduced to an oxygen ion, and when hydrogen is supplied to the fuel electrode through the hydrogen supply pipe, hydrogen is oxidized so that electrons are discharged through an external circuit, and as a result, the electrons flow from the fuel electrode to the air electrode to produce direct electricity and the upper jig 10 is in contact with the air electrode and the lower jig 20 is in contact with the fuel electrode, thereby detecting current/voltage which flows through the unit cell. Data on the detected current and voltage moves to the measuring unit to evaluate power consumption of the unit cell per unit area.

The upper jig 10 and the lower jig 20 may further include a current/voltage detecting unit (not illustrated) which is in contact with an air electrode and a fuel electrode of the unit cell to measure any one or more of a current and a voltage which are output to the unit cell. When the detecting unit is formed in the upper jig 10, the detecting unit may downwardly protrude, and when the detecting unit is formed in the lower jig 20, the detecting unit may be formed to upwardly protrude. The detecting unit formed in the upper jig 10 is in contact with the air electrode, and the detecting unit formed in the lower jig 20 is in contact with the fuel electrode, thereby detecting the current and the voltage of the unit cell.

In this case, the detecting unit may be formed of a single wire or a pair of wires may be formed to have a probe shape, and for example, one side of the detecting unit, which is in contact with the air electrode, discharges the current, and the other side of the detecting unit is applied with current, which is re-discharged from the air electrode, thereby measuring the voltage of the air electrode, The current and the voltage of the fuel electrode may be measured by the same manner.

While the present invention has been described with reference to the preferred exemplary embodiments, it will be understood by those skilled in the art that various changes and modifications of the present invention may be made without departing from the spirit and the scope of the present invention as defined in the following claims.

The invention claimed is:

1. A jig module for a solid oxide fuel cell, the jig module comprising:
   a lower jig which includes: a seating groove; a hydrogen supply pipe having one side connected to the seating groove; and a hydrogen discharge pipe having the other side connected to the seating groove;

an upper jig including an oxygen supply pipe and an oxygen discharge pipe;

a press unit which moves the upper jig and the lower jig in a vertical direction; and a control unit which controls the vertical movement of the press unit, wherein the upper jig is coupled to be fitted into the seating groove to form a sealed portion.

2. The jig module of claim 1, wherein the upper jig is configured such that one side of the oxygen supply pipe and the other side of the oxygen discharge pipe communicate with each other toward the sealed portion.

3. The jig module of claim 1, wherein the upper jig and the lower jig have cylindrical shapes.

4. The jig module of claim 1, wherein valves which control flow rates of oxygen and hydrogen are provided at one end of each of the hydrogen discharge pipe and the oxygen discharge pipe.

5. The jig module of claim 1, further comprising:
a measuring unit which measures, when a sealant is located in the seating groove, whether the gas is leaked through the sealant and attachment strength of the sealant.

6. The jig module of claim 1, further comprising:
a measuring unit which evaluates, when a unit cell is located in the seating groove, a performance of the unit cell.

7. The jig module of claim 1,
wherein the control unit controls any one or more of a flow rate of oxygen which flows into the oxygen supply pipe, and a flow rate of hydrogen which flows into the hydrogen supply pipe.

* * * * *